United States Patent [19]

Sury

[11] Patent Number: 4,481,720
[45] Date of Patent: Nov. 13, 1984

[54] COMBINED LEVEL AND PROTRACTOR WITH CALIBRATION FEATURES

[76] Inventor: Francis P. Sury, 12720 Highway 92, Dover, Fla. 33527

[21] Appl. No.: 492,566

[22] Filed: May 9, 1983

[51] Int. Cl.³ .............................................. B43L 7/06
[52] U.S. Cl. ...................................... 33/451; 33/496; 33/471; 33/452
[58] Field of Search ................. 33/451, 418, 424, 426, 33/465, 374, 383, 384, 385, 452, 471, 496, 498, 499

[56] References Cited

U.S. PATENT DOCUMENTS

| | | | |
|---|---|---|---|
| 596,818 | 1/1898 | Moore | 33/383 |
| 1,014,402 | 1/1912 | Larsen | 33/383 |
| 1,260,229 | 3/1918 | Marx et al. | 33/385 |
| 1,927,504 | 9/1933 | Rudolff | 33/383 |
| 2,247,327 | 6/1941 | Brady | 33/451 |
| 4,144,650 | 3/1979 | Rawlings et al. | 33/451 |
| 4,394,801 | 7/1983 | Thibodeaux | 33/471 |

Primary Examiner—Willis Little
Attorney, Agent, or Firm—Harvey B. Jacobson

[57] ABSTRACT

An elongated body is provided including opposite side portions removably secured together by transverse threaded fasteners. One set of corresponding ends of the side portions include relieved areas opening toward each other defining a cavity opening outwardly of the corresponding end of the body and along one longitudinal edge thereof. A protractor arm is pivotally mounted within the notch for movement between a retracted position received within the cavity and extending along the one edge and an extended position disposed at substantially 90° relative to the elongated body. The body and protractor arm include coacting structure for adjustably limiting angular displacement of the protractor arm to the extended position and the ends of the opposite side portions of the body remote from the protractor arm include two pairs of opposing sockets formed therein in which spirit level supporting annular bodies are mounted. The bodies are angularly adjustable in the corresponding sockets and clamped in adjusted angularly displaced positions between the body opposite side portions. The body side portions including windows registered with the spirit levels and a first form of the invention incorporates worm wheel teeth on the annular bodies and worm gear shafts journaled between the body side portions and meshed with the worm wheels. In a second form of the invention, the body side portions are notched and the annular bodies include a peripheral recess registered with the notches with which a lever tool may be engaged through the notches.

7 Claims, 9 Drawing Figures

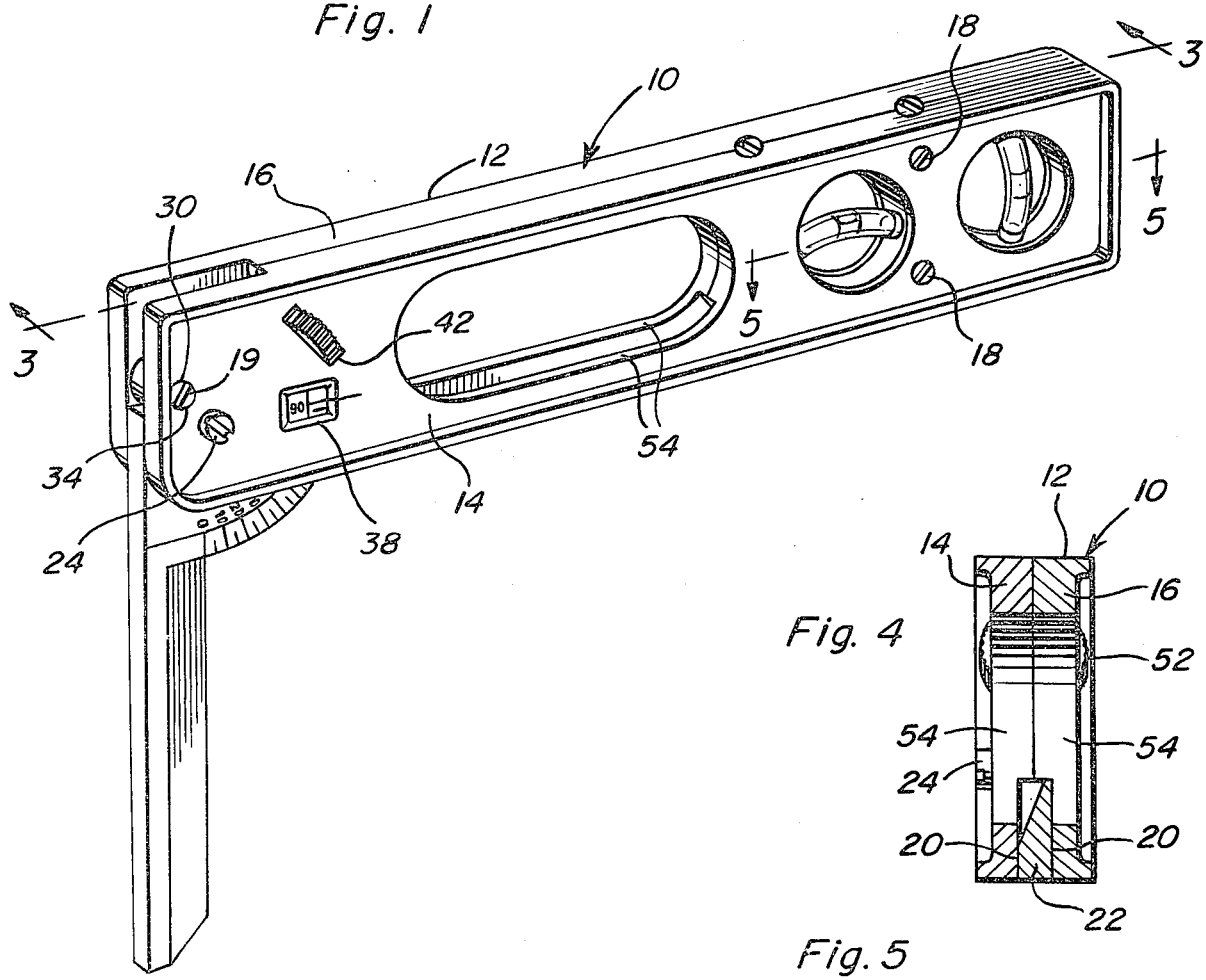

COMBINED LEVEL AND PROTRACTOR WITH CALIBRATION FEATURES

BACKGROUND OF THE INVENTION

Levels are conventionally used by carpenters and other workmen to determine level and plumb surfaces and some forms of levels are provided with protractor arms and thus may be used as squares and protractors.

However, the spirit vials of some levels shift so as to be improperly calibrated and continued use of protractor arm equipped levels often results in the protractor arms thereof not being properly calibrated to define 90° angles.

Accordingly, a need exists for a level of the spirit vial equipped type and wherein the spirit vials are supported from a level in a manner such that they may be calibrated, if required. In addition, a need further exists for a protractor arm equipped type of level wherein the 90° position of the protractor arm may be calibrated, when required.

Examples of various different forms of levels including some of the general structural and operational features of the instant invention are disclosed in U.S. Pat. Nos. 513,183, 596,818, 602,524, 1,026,967, 1,037,155, 1,260,299, 1,306,722, 1,440,284, 1,920,892 and 2,770,889.

BRIEF DESCRIPTION OF THE INVENTION

The protractor arm and spirit vial equipped level of the instant invention is constructed in a manner whereby the level may be calibrated in a manner such that swinging movement of the protractor arm outwardly from its retracted position toward its extended position may be limited to that position in which the protractor arm is disposed at 90° relative to the body of the level. In addition, the level is further equipped with releasable brake structure whereby the protractor arm may be releasably locked in any angularly adjusted position thereof. Still further, the spirit vials of the level are mounted in annular supporting bodies which are mounted from the level in a manner such that the annular mounting bodies may be angularly adjusted relative to the body for calibration of the spirit vials supported therefrom and releasably locked in calibrated positions.

The main object of this invention is to provide a level of the spirit vial and pivoted protractor arm equipped type and wherein the spirit vials and protractor arm may be calibrated, when necessary.

Another object of this invention is to provide a level in accordance with the immediately preceding object and wherein calibration of the protractor arm and spirit vials thereof may be readily carried out.

Still another important object of this invention is to provide a level of the protractor arm type including structure whereby the protractor arm may be releasably locked in any adjusted angular position thereof.

A final object of this invention to be specifically enumerated herein is to provide a level in accordance with the preceding objects and which will conform to conventional forms of manufacture, be of simple construction and easy to use so as to provide a device which will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of the level of the instant invention with the protractor arm thereof in a 90° extended position;

FIG. 2 is a side elevational view of the level with the protractor arm thereof in a fully retracted position;

FIG. 4 is an enlarged vertical sectional view taken substantially upon the plane indicated by the section 4—4 of FIG. 2;

FIG. 5 is an enlarged fragmentary horizontal sectional view taken substantially upon the plane indicated by the section line 5—5 of FIG. 1;

DETAILED DESCRIPTION OF THE INVENTION

Figure 3:
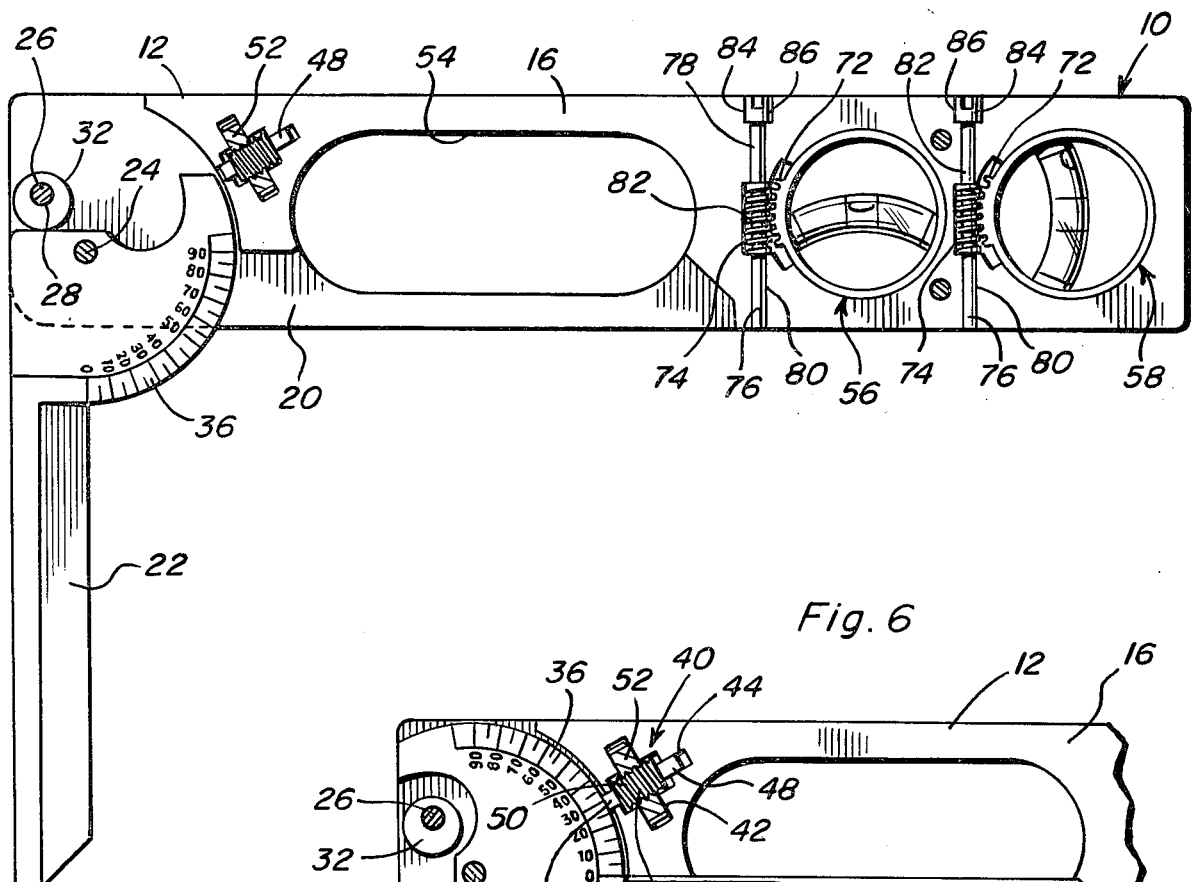
FIG. 3 is an enlarged vertical sectional view taken substantially upon a plane indicated by the section line 3—3 of FIG. 1.

Referring now more specifically to the drawings, the numeral 10 generally designates the level of the instant invention. The level 10 includes an elongated rectangular body 12 comprising opposite side portions 14 and 16 secured together by threaded fasteners 18 and 19. One pair of corresponding ends of the opposite side portions 14 and 16 include mirror image recesses 20 formed in the opposing sides thereof and a protractor arm 22 is oscillatably mounted in the recesses 20 by a pivot fastener 24 also serving as a fastener to secure the opposite side portions 14 and 16 together. Still further, a cam shaft 26 is provided and includes opposite end shaft portions 28 rotatably journaled through the bores 30 provided in the opposite side portions 14 and 16. The cam shaft 26 includes a center cam lobe 32 and one of the shaft portions 28 includes a screwdriver kerf 34 formed therein whereby the cam shaft 26 may be angularly adjusted from the exterior of the body 12.

Figure 6:
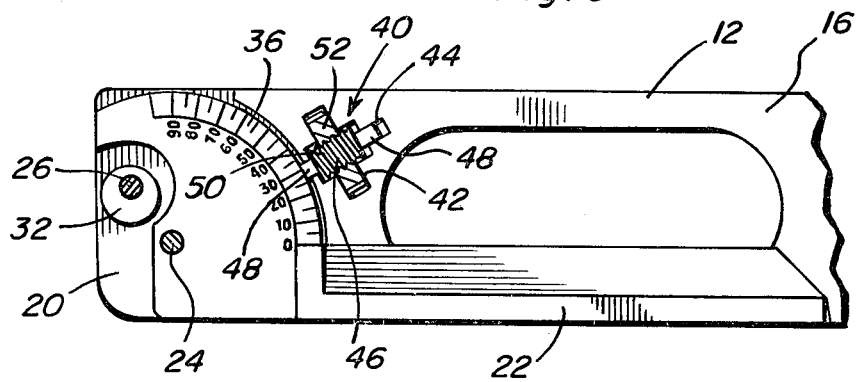
FIG. 6 is a fragmentary vertical sectional view similar to the left-hand portion of FIG. 3 but with the protractor arm in a full retracted position.

The protractor arm 22 includes degree indicia 36 thereon viewable through a window 38 formed in the side portion 14, and it will be noted that the axial extent of the cam lobe 32 is substantially equal to the combined depths of the recesses 20 while the thickness of the protractor arm 22 is slightly less than the combined depth of the recesses 20. Accordingly, when the fastener 24 is tightened, the cam lobe 32 is clamped in adjusted position while the protractor arm 22 may be swung between the extended 90° position thereof illustrated in FIG. 3 and the fully retracted position thereof illustrated in FIG. 6.

In order to maintain the protractor arm 22 in a given angularly adjusted position, a stop structure referred to in general by the reference numeral 40 is provided. The stop or brake structure 40 includes a pair of angulated slot-type windows 42 formed in the opposite side portions 14 and 16 and a pair of mirror image recesses 44 formed in the imposing sides of the portions 14 and 16. A screw shaft 46 includes opposite end shank portions 48 which are journaled in the recesses and an externally threaded diametrically enlarged midportion 50 disposed therebetween. An internally threaded thumb wheel 52 is threaded on the midportion 50 and has diametrically opposite peripheral portions thereof projecting outwardly of the windows 42. The recesses 44 open into the recesses 20 and the shank portion 48 opposing the sector portion of the protractor arm 22 is engageable therewith upon rotation of the thumb wheel 52 to advance the latter along the midportion 50 in a direction away from the protractor arm 22. In this manner, the protractor arm 22 may be releasably locked in adjusted position.

The opposite side portions 14 and 16 also include large windows 54 formed therethrough which register with each other and define a hand grip for the level 10. In addition, the recesses 20 open into the windows 54 in order to prevent the accumulation of foreign material in the recess 20.

The level 10 also includes a pair of spirit level assemblies referred to in genereal by the reference numerals 56 and 58 and the spirit level assemblies 56 and 58 are clampingly received in chambers 60 and 62 formed between the opposing sides of the portions 14 and 16. Each of the portions 14 and 16 includes a pair of transverse bores 64 formed therethrough and the inner ends of the bores 64 include counterbores 66. The corresponding bores 64 and counterbores 66 formed in the portions 14 and 16 coact to define the chambers 60 and 62 and the spirit level assemblies 56 and 58 include annular mounting ring portions 68 which are substantially the same axial extent as the combined axial dimensions of the corresponding counterbores 66. Accordingly, when the mounting ring portions 68 are received in the chambers 60 and 62 and the screws or fasteners 18 are tightened, the mounting ring portions 68 are held in adjusted rotated positions within the chambers 60 and 62. Each of the spirit level assemblies 56 and 58 also includes an arcuate spirit vial 70 of conventional design and each mounting ring portion 68 includes a sector gear 72 on its periphery with which a corresponding worm gear 74 is meshed. Each of the worm gears 74 include opposite end shank portions 76 and 78 which are journaled in opposing semi-cylindrical grooves 80 and 82 formed in the opposing sides of the portions 12 and 14 and the grooves 82 include enlarged outer ends 84 in which enlarged slotted heads 86 are received. Accordingly, the slotted heads 86 may be turned by a screwdriver, after the screws 18 have been loosened, in order to angularly displace the spirit level assemblies 56 and 58 within the chambers 60 and 62 in order to calibrate the spirit level assemblies 58.

Figure 7:
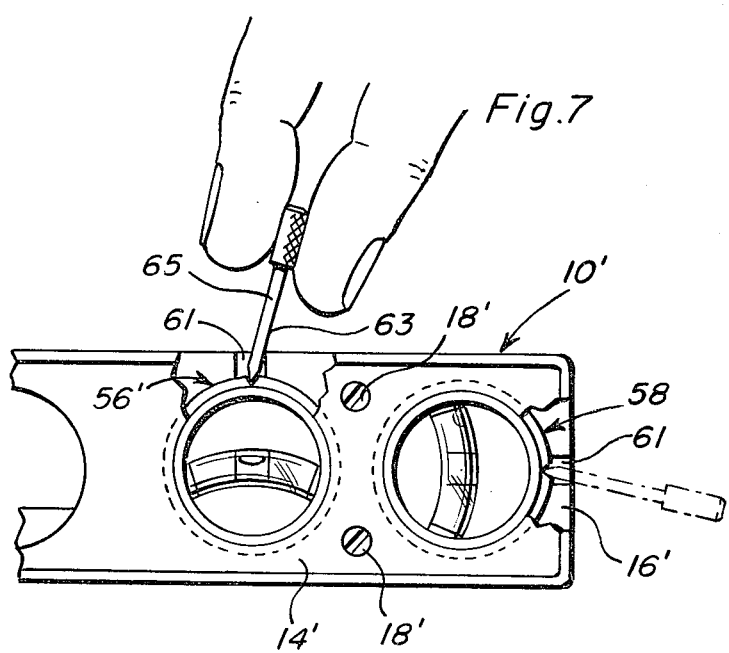
FIG. 7 is a fragmentary side elevational view of a modified form of level incorporating a different means for adjustably angularly shifting the annular spirit level supporting bodies for calibration of the spirit levels.
Figure 9:
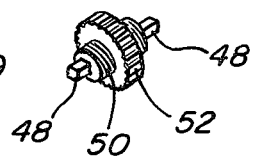
FIG. 9 is a perspective view of the adjustable brake structure by which the protractor arm may be releasably maintained in adjusted angularly adjusted position.
Figure 8:
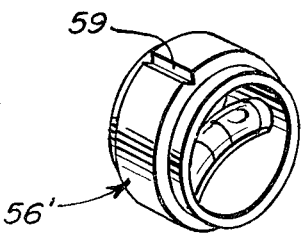
FIG. 8 is a perspective view of one of the spirit level supporting annular bodies of the modified form illustrated in FIG. 7.

In a modified form of the invenion illustrated in FIGS. 7 and 8, spirit level assemblies 56' and 58' are provided including peripheral notches 59 and opposite side portions 14' and 16' of the modified form of level 10' include notches 61 formed therein which together define access openings through which the shank portion 63 of a lever-type tool 65 may be inserted in order to angularly adjust the spirit level assemblies 56' and 58' upon loosening of the screws or fasteners 18' of the level 10'. Of course, the worm gears 74 and 76 and the journaling grooves of the opposite side portions 14 and 16 are not included in the level 10'.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A combined level and protractor assembly including an elongated body comprising a pair of laterally abutted elongated opposite side body members, the opposing sides of said body members defining one end of said body including opposing recesses formed therein together defining a cavity opening endwise outwardly of said one end and through one longitudinal edge of said body along the latter from said one end to points spaced therealong toward the other end of said body, an elongated protractor arm having one end thereof pivotally supported within said cavity for angular displacement of said arm relative to said body between an extended position projecting outwardly of said one edge at 90° relative thereto and a retracted position received within the portion of said cavity extending along said one edge, spirit level assembly means carried by the other end of said body, the ends of said body members defining the other end of said body including opposing sockets formed therein, said spirit level assembly means including mounting frame means captively received in said sockets, the portions of said members defining said sockets having transverse window openings formed therethrough registered with said sockets for viewing said spirit level assembly means from the outer sides of said members, said body members being removably secured together through the utilization of threaded fasteners secured through one of said body members and threadedly engaged relative to the other body member, said frame means being clamped between the portions of said members defining the inner extremities of said sockets, control means operable to adjustably limit swinging movement of said arm toward the extended position thereof, said control means comprising a cam rotatably mounted from said body members, disposed in said cavity and engageable by said arm for limiting swinging thereof toward said extended position, said cam including a journal shaft portion received through a journal bore provided therefor in one of said body members and engageable from the exterior of said body to rotate said shaft portion, and thus said cam, said cam being releasably clamped in adjusted position between said body members and within said cavity upon the tightening of said threaded fasteners, said body members including registered handhold defining transverse openings formed therethrough, the end portion of said cavity remote from said one end of said body opening into both said openings through the sides thereof adjacent said one longitudinal edge of said body.

2. The assembly of claim 1 wherein said sockets are substantially circular and said frame means are substantially cylindrical and angularly displaceable in said sockets.

3. The assembly of claim 2 including adjustment means operable from the exterior of said body and engageable with said frame means for adjustably angularly displacing said frame means in said sockets upon loosening of said fasteners.

4. The combination of claim 3 wherein said adjustment means include sector gear means carried by said frame means worm gear means journaled between said body members meshed with said sector gear means.

5. The assembly of claim 3 wherein said adjustment means includes access slot means formed in marginal portions of said body and opening into said sockets, each of said frame means including an outwardly facing recess, and an elongated lever tool insertable through said slot means and including one end portion engageable in said outwardly facing recess.

6. The assembly of claim 1 including brake means operatively to releasably lock said arm in adjusted rotated positions thereof.

7. The assembly of claim 6 wherein said arm includes an arcuate portion thereof having protractor indicia thereon, one of said body members having a transverse aperture formed therein through which said indicia may be viewed from the exterior side of said one body member.

* * * * *